March 15, 1938.                C. W. BAILEY ET AL                2,111,351
                           COUNTER MOLDING MECHANISM
                            Filed March 13, 1936
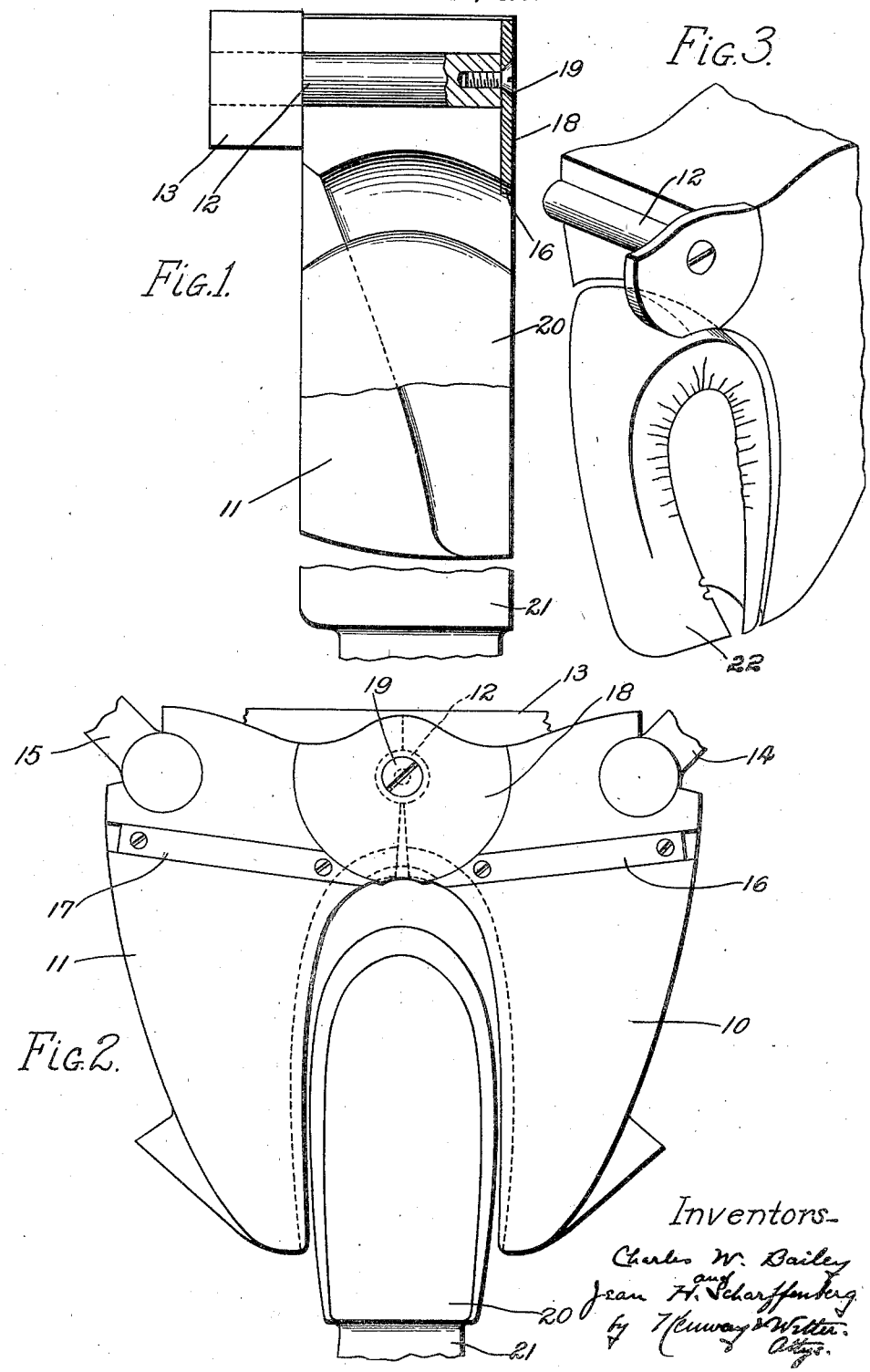

Patented Mar. 15, 1938

2,111,351

UNITED STATES PATENT OFFICE 2,111,351

COUNTER MOLDING MECHANISM

Charles W. Bailey and Jean H. Scharffenberg, Lynn, Mass., assignors to Stewart Bros., Lynn, Mass., a co-partnership consisting of John Hammond Stewart and Roland A. Stewart Application March 13, 1936, Serial No. 68,742

6 Claims. (Cl. 12—66)

This invention relates to counter molding mechanism and comprises improvements therein effective for increasing the useful field of such mechanism and for improving the accuracy of the counter molding operation.

A particularly important field of use of the invention is in the molding of counters having an extreme rake at the rear of the heel seat. Such counters have been difficult to mold heretofore because of the relatively large area of the counter at the rear which is not directly controlled by the molds in their closing-in movement. Operators have met this difficulty to some extent heretofore by subjecting each counter to two or three partial molding operations, as by partially molding the counter with a long leg on one side, then adjusting and partially molding the counter with the long leg on the other side, and finally completing the molding operation with the counter in central position. Another difficulty with such counters and, to some extent, with counters in general, has been that the material of the counter is likely to get caught and pinched between the meeting faces of the side molds when the latter are closed, thus tending to form a fin at the back of the counter which is objectionable from the standpoint of shoemaking.

The present invention solves these difficulties and provides counter molding mechanism having superior qualities in respect to accuracy of operation and convenience to the operator as compared to counter molding mechanism heretofore available.

As herein shown, an auxiliary mold section is provided at the vertex of the side molds and this is shaped so as to complete the contour of the whole molding surface when the molds are closed and to permit free movement of the mold sections at all times. The auxiliary section preferably does not partake of the pivotal movement of the side molds, but acts as a stationary gauge when the counter blank is presented in molding position. Moreover, it acts as a guard member positively preventing the rear portion of the counter adjacent to the heel seat from getting caught between the meeting faces of the side molds.

In a preferred embodiment of the invention the auxiliary mold section may comprise a disk or plate mounted concentrically with the axis of movement of the side mold sections, and consequently permitting free opening and closing movement thereof. If desired, portions of the side molds may be reinforced, particularly adjacent to the auxiliary mold section.

These and other features of the invention will be best understood and appreciated from the following description of a preferred embodiment thereof, selected for purposes of illustration, and shown in the accompanying drawing in which, Fig. 1 is a view of the molds in side elevation, partly in section, Fig. 2 is a view of the molds in front elevation, and Fig. 3 is a fragmentary view in perspective showing a counter in relation to one of the molds.

The invention is herein shown as embodied in a counter molding machine of the general type disclosed in U. S. Letters Patent No. 2,048,589 granted July 21, 1936 upon the application of Charles W. Bailey, this type of machine having cooperating side molds located in vertical position and arranged to swing with respect to each other about a common horizontal axis in opening or closing. The male member of the mold is movable with the counter blank upwardly into the opening of the side molds to present the counter blank in molding position and when these molds have been closed a flange forming plate is moved vertically across the face of the closed molds to form the inturned margin in the counter. This is a commercial type of counter molding machine in wide use among the trade, and while the present invention is herein shown as embodied therein, it is in no sense limited to that or to any specific type of counter molding machine.

As herein shown, the side molds 10 and 11 are supported for pivotal movement about the axis of a horizontal pin 12 which projects forwardly from a vertically movable cross-head 13. A pair of toggle links 14 and 15 extend between the outer corners of the respective side molds and fixed sockets in the machine frame, and act powerfully to close the side molds when the latter are lifted by the upward movement of the male mold or plug 20. This is formed upon the upper end of jack 21 and is lifted by a powerful train of mechanism at a proper point in the cycle of the machine, and after the operator has had an opportunity to position the counter blank thereon.

The side molds 10 and 11 have cooperating inner concave faces shaped to conform with the contour of the male mold 20 and, as shown in Fig. 1, the curvature of the rear portion of the molding faces is of pronounced concave curvature, so much so that, as already explained there is a tendency for the rear end of the counter to be pinched between the meeting faces of the side molds at this point. The concave molding surface of the side molds 10 and 11 is formed in a small part by the ends of steel bars 16 and 17 which are permanently secured in grooves in the face of the respective side molds. The inner ends of these bars supply material of superior strength in a portion of the molding face which might otherwise tend to break down on account of its fragile cross section. More particularly they supply steel instead of cast iron for the thin edge of the molds which is fitted to the periphery of the disk 18, to be referred to hereinafter.

In order to serve as a guard to prevent the counter from getting caught and pinched between meeting faces of the mold when they are closed and also in general to control the position of the counter blank more accurately, the side molds are provided with an auxiliary mold section comprising a steel disk or plate 18 which is secured to the outer end of the pin 12 by a counter-sunk screw 19. The outer faces of the side molds are circularly recessed to receive the disk 18 so that the assembled molds present a flush surface over which the flange forming plate may travel in its operative stroke. The recess for the disk 18 is formed in part by the ends of the steel bars 16 and 17. The periphery of the disk 18 and of the counter-sunk surface of the side molds which receive it are concentric about the axis of the pin 12 so that the side molds may swing freely in their opening and closing movement. The lower edge face of the disk 18 bridges the gap between the meeting faces of the side molds and is inwardly concave in contour so that it exactly fills and preferably supplements the concave curvature of the molding faces of the molds when the latter are in closed position.

It will be seen, particularly in Fig. 3, that the lower edge of the disk 18 positively prevents entrance of the rear portion of the counter 22 between the meeting faces of the side molds and also presents a stationary auxiliary molding surface with which the rear portion of the counter blank may be engaged when the male mold is lifted and which serves positively to position the rear portion of the counter during the closing of the molds. On this account the formation of a fin is not only avoided, but the counter is more accurately and positively controlled during its presentation to the molding faces and during the molding operation.

It will be understood that the control of the counter blank in the molds is improved in the mechanism of our invention by reason of the fact that as the counter blank is advanced into the mold cavity by the elevation of the male mold 20, the curved end of the counter is preliminarily engaged against the molding face of the disk 18. This occurs preliminarily to the closing in movement of the side molds and thus a portion of the counter is positively engaged and given the general curvature of the mold. The counter blank is thus prevented from tilting or being crowded into a peak which might otherwise find its way into the space between the meeting surfaces of the side molds.

It will be noted that by reason of the concentric relation of the mold sections 10 and 11 and the disk 18 with respect to the axis of the pin 12, there is at no time a crack or break in the continuous contour of the outer edge of the concave contour of the mold sections.

Having thus described our invention, what we claim as new and desire to secure by Letters Patent of the United States is,

1. Counter molding mechanism including molds pivotally connected and having cooperating concave molding faces, and a stationary element having a guard portion concentric with the axis of said connection and a face shaped to complete the mold surface when the molds are closed and to maintain a continuous concave contour in the mold cavity during the closing movement of the molds.

2. Counter molding mechanism including cooperating side molds connected for movement about an axis external to their molding surfaces, and a plate having its periphery concentric with said axis let into the body of the side molds and having an auxiliary molding face maintaining a continuous concave contour in the mold cavity during closing movement of the molds.

3. Counter molding mechanism including side molds pivotally mounted for movement about a common axis, and an auxiliary mold section having a sliding fit with the side molds in circular arcs concentric with said common axis, and a face maintaining a continuous concave contour in the cavity of the side molds during their closing movement.

4. Counter molding mechanism including side molds mounted for pivotal movement about a common pin and having molding faces and oppositely disposed meeting faces located between said pin and their respective molding faces, and a disk fast to the outer end of said pin and located in position to prevent counter material from entering the space between said meeting faces when the molds are being closed.

5. Counter molding mechanism including pivotally mounted side molds having a counter-shaped cavity between them and a shallow recess with circular walls let into the outer faces of the molds, a disk mounted in said recess and having a portion of its edge exposed in the mold cavity, and reinforcing bars emerging into the mold cavity on either side of the disk.

6. Counter molding mechanism including pivotally mounted side molds having a counter-shaped cavity between them and a shallow recess with circular walls let into the outer faces of the molds, a stationary disk located in said recess and having a portion of its periphery exposed in the mold cavity, and reinforcing bars located in the faces of the side molds, each bar engaging a segment of the disk and forming also a portion of the face of the mold cavity adjacent thereto.

CHARLES W. BAILEY.
JEAN H. SCHARFFENBERG.